No. 745,726. Patented December 1, 1903.

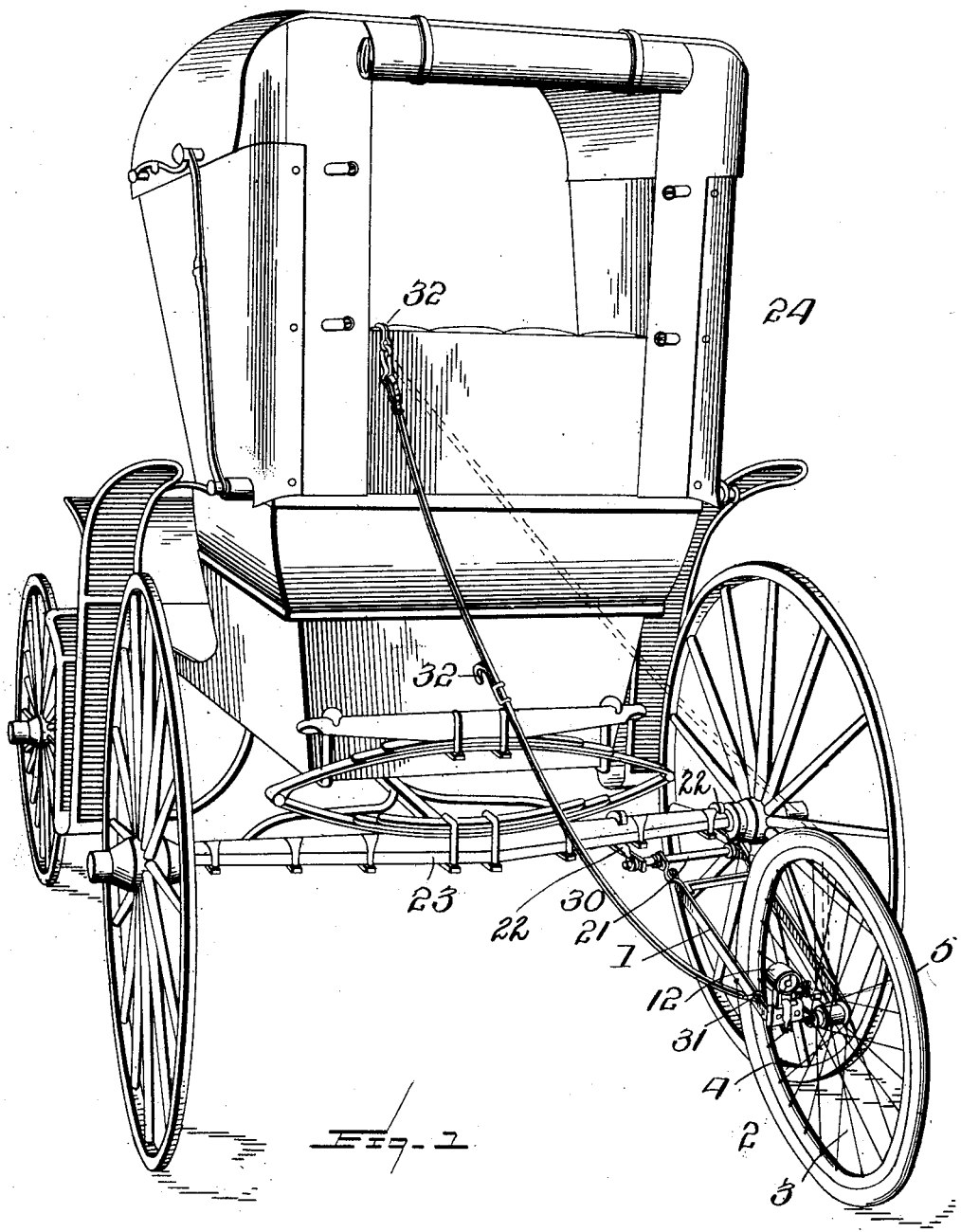

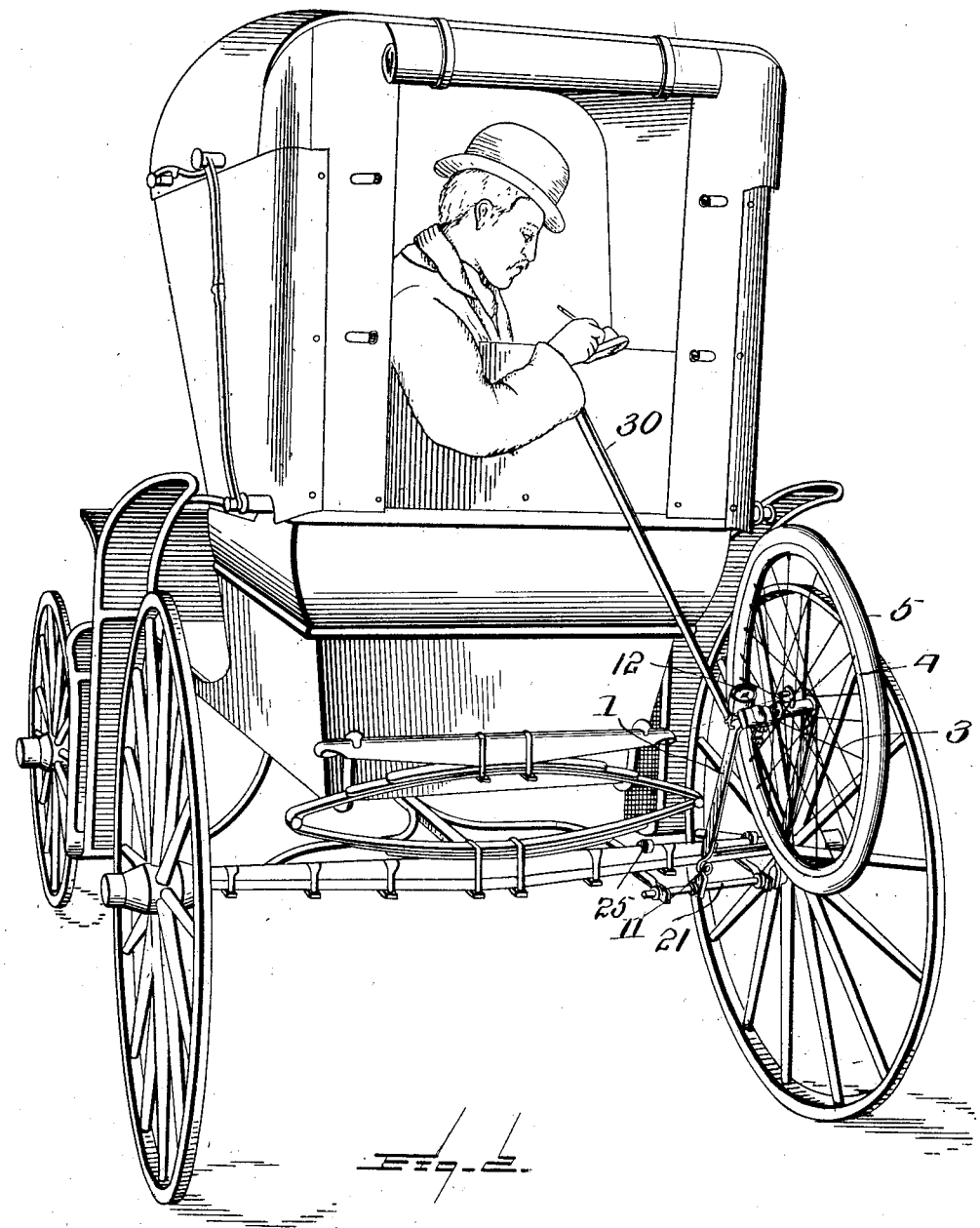

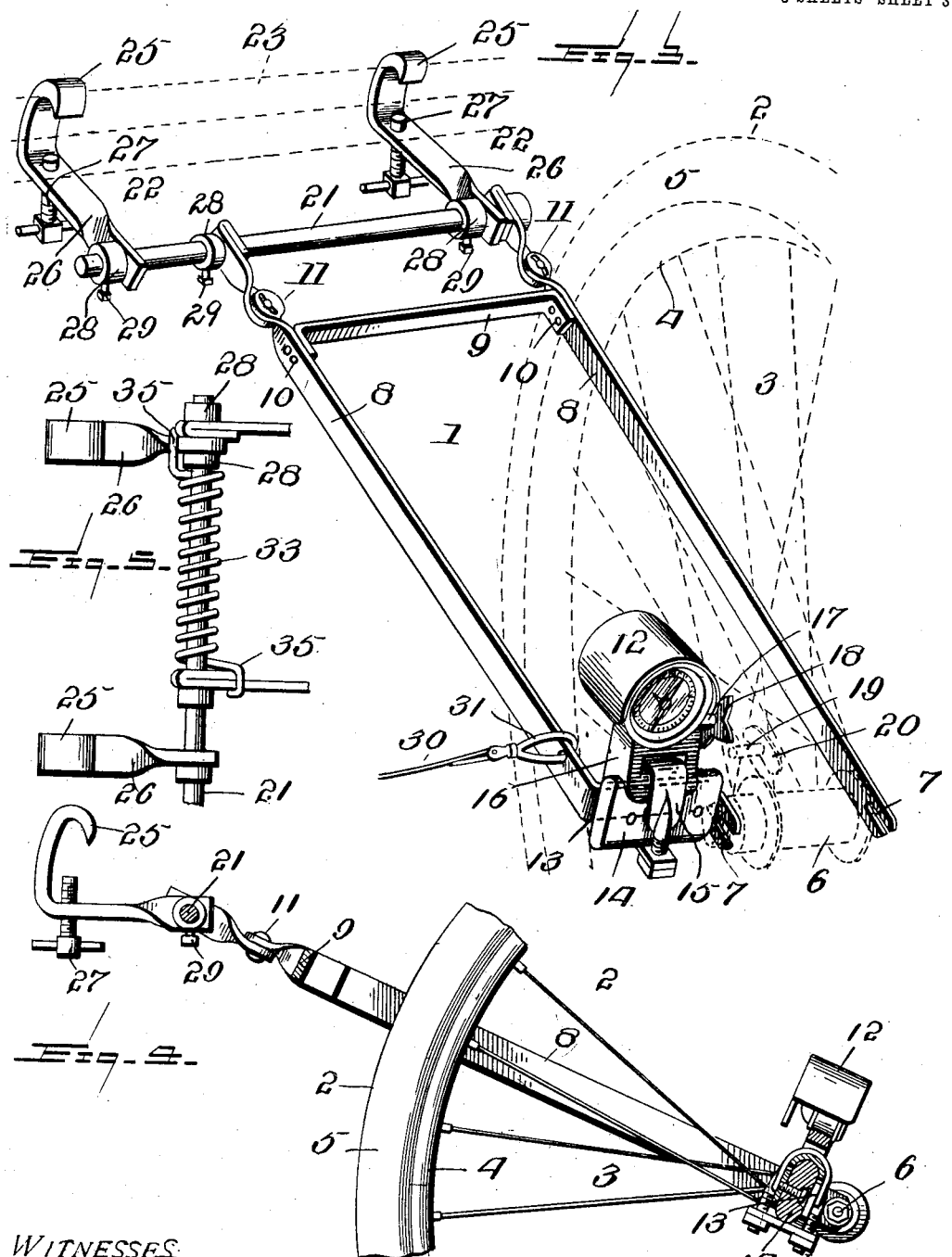

UNITED STATES PATENT OFFICE.

EUGENE H. HATHAWAY, OF WASHINGTON, DISTRICT OF COLUMBIA.

ODOMETER.

SPECIFICATION forming part of Letters Patent No. 745,726, dated December 1, 1903.

Application filed January 24, 1903. Serial No. 140,387. (No model.)

*To all whom it may concern:*

Be it known that I, EUGENE H. HATHAWAY, a citizen of the United States, residing at Washington, District of Columbia, have invented certain new and useful Improvements in Distance-Measuring Attachments for Vehicles, of which the following is a specification.

This invention relates to the general class of registering instruments or appliances, and has special reference to a device of this character possessing special utility as a distance-measuring attachment for vehicles.

To this end the invention primarily contemplates a simple and practical type of measuring appliance capable of ready attachment to any vehicle and embodying means for accurately measuring the extent or distance of the surface over which the vehicle is drawn. In the carrying forward of this function the invention is intended for distance-measuring purposes generally, and is therefore particularly useful in surveying and analogous work where it is desirable to expeditiously and yet accurately measure the distance or extent of a surface between predetermined or given points. Also the invention is of special utility in measuring out rural delivery and like routes which are of predetermined extent, thereby greatly facilitating the apportionment of routes of this character, besides conveniently measuring the distance or extent of the route by simply carrying the appliance upon the vehicle as a floating or trailing attachment.

A further object of the invention is to provide an improved form of attachment capable of adjustment or adaptation to any required position upon the vehicle, while at the same time being of a self-adjusting nature, so as to adapt itself to the inequalities and other characteristics of the surface over which it travels, and also being capable of lateral adjustment or positioning to properly locate the surface traveler or wheel upon the road or surface.

Another object of the invention is to provide a novel arrangement of parts whereby the attachment may not only be held out of action, but may also quickly and conveniently be inspected from time to time and readings taken from the register or odometer by the occupant of the seat without getting out of the vehicle.

With these and many other objects in view, which will more readily appear as the nature of the invention is better understood, the same consists in the novel construction, combination, and arrangement of parts, as will be hereinafter more fully described, illustrated, and claimed.

The essential features of the invention involved in the novel manner of hanging and manipulating the attachment are necessarily susceptible to a variety of modifications without departing from the spirit or scope of the invention, but the preferred embodiment thereof is shown in the accompanying drawings, in which—

Figure 1 is a perspective view of a vehicle equipped with the distance-measuring attachment constructed in accordance with this invention and shown in its lowered operative position. Fig. 2 is a similar view showing the manner of temporarily elevating the attachment so that the occupant of the seat may take readings of the distance registered or recorded. Fig. 3 is a perspective view of the attachment removed from the vehicle. Fig. 4 is a longitudinal sectional view of the attachment. Fig. 5 is a detail view illustrating the use of a holding-spring associated with the carrier-frame if it is found desirable to supplement gravity for maintaining the surface wheel in contact with the ground.

Like reference-numerals designate corresponding parts throughout the several figures of the drawings.

In carrying out the invention various parts of the attachment are susceptible to structural modification without affecting the essential features of the invention, which features are preserved in all embodiments thereof. As a practical and demonstrated construction is shown in the drawings, particular reference will now be made thereto.

The attachment as an entirety is usually employed as a trailer for the vehicle with which it is employed, and in its general organization the same includes a self-adjusting swinging carrier-frame 1, which supports and carries a floating surface wheel 2, which in effect constitutes the measuring element or member of the appliance and rolls upon the surface over which the vehicle is drawn.

It is preferable in the carrying out of the invention to employ a floating surface wheel 2 of the bicycle type on account of its strength and lightness. This is exemplified by the drawings, in which is illustrated a wheel having a wire-spoked body 3, supporting the usual wooden rim 4, to which is fitted the pneumatic tire 5. This structure of wheel is very desirable inasmuch as it will lightly ride upon muddy and watery surfaces and when equipped with a tire of sufficient buoyancy will float the attachment through water. However, other forms of surface wheels may be employed in conjunction with the other elements of the attachment, but the wheel, of whatever type, is provided with the usual journal-axle 6, whose opposite extremities are adjustably and detachably bolted or otherwise suitably clamped in the notched journal-supporting ends 7 at the lower free extremities of the side bars 8 constituting the main portions of the self-adjusting swinging carrier-frame 1. In one of its practical embodiments, as shown in the drawings, the said self-adjusting swinging carrier-frame 1 for the floating surface wheel 2 essentially consists of the oppositely-arranged side bars 8, arranged in substantial parallelism and preferably rigidly united or connected through the medium of one or more suitably-disposed braces 9, arranged transversely of the frame and riveted or otherwise rigidly fastened at their extremities, as at 10, to the opposite side bars. It is also desirable, though not essential, to provide the side bars of the carrier-frame, preferably adjacent to the upper pivotally-hung extremities thereof, with pivot-joints 11, disposed at right angles to the main pivotal support for the frame, whereby the latter is free to swing or adjust itself in a lateral direction to better adapt itself to the vehicle when turning, and thus preventing side slipping or skipping of the surface wheel 2, as there might at times be a tendency to do under such conditions.

The self-adjusting swinging carrier-frame 1 not only provides a carrier or support for the floating surface wheel 2, but also supports in operative relation to the said wheel a registering or recording device 12 of any standard or approved make. Usually it has been found preferable to employ as the registering device 12 a standard form of odometer properly scaled to the diameter of the surface wheel in order to accurately register or record the extent of surface over which the said wheel rolls.

One of the important features of the invention is the novel arrangement of the register or odometer 12. This is preferably provided for as shown in the drawings, and consists in forming one of the side bars 8 of the carrier-frame, at or adjacent to the lower extremity thereof, with a lateral offset 13, to which is screwed or otherwise suitably fastened a holding-block 14, conforming somewhat to the transverse form of a vehicle-axle and combining with the said offset 13 to provide a laterally-offset register-support which has detachably clamped thereover the clip-bolt 15. This clip-bolt 15 is a securing-clamp for the register or odometer 12, having an upstanding base-bracket 16, through which the clamp 15 passes and serves to hold the body of the register or odometer in an upright position. The exterior actuating-stem 17 of the register or odometer projects from the inner side thereof next to the wheel 2 and carries the usual star-wheel 18, engaged by the operating button or tappet 19, held to the spokes of the wheel by a suitable clamp 20 in such position that the said button or tappet will move against the star-wheel once each revolution of the surface wheel.

In connection with the mounting of the register or odometer 12 it is also important to the successful carrying out of the invention that the same be so arranged that the dial or reading-face shall be reversed—that is, disposed toward the rear of the attachment and the vehicle when the attachment is in its lowered operative position with its scale inverted—thus permitting the said dial or reading-face of the register or odometer to be brought to an easy reading position with reference to the occupant of the vehicle when drawn up to the position indicated in Fig. 2, as will be presently explained.

In the mounting of the attachment to permit of the vertical self-adjustment of the carrier-frame the latter is associated with a main pivotal support, which in the form of the invention shown in the drawings is illustrated as essentially consisting of a horizontally-arranged pivot-rod 21 and the attachment-hangers 22, carrying the said rod and adapted to be detachably clipped or clamped to the axle 23 of the vehicle 24, as shown in the drawings. The upper extremities of the side arms 8 above their supplemental pivot-joints 11 are loosely mounted on the rod 21, which, being held in a stationary position, permits the carrying-frame to readily rise and fall to accommodate the surface wheel to the irregularities of the surface over which it travels, and the attachment hangers 22, which provide for the support of the rod 21, are preferably in the form of open-sided hooks 25, having the bracket-arms 26, in which the pivot-rod 21 is supported and fitted with the binding-screws 27, coöperating with the main portions of the hooks for fastening the same in any desired position upon the axle 23 of the vehicle. As illustrated in the drawings, this axle is usually the rear one, whereby the attachment trails in rear of the vehicle and is disposed in position for being lifted up from time to time, so that the occupant of the vehicle may take the necessary readings.

The pivot-rod 21 of the main pivotal support for the carrier-frame is preferably of a length to permit of a sufficient lateral adjustment of both the carrier-frame and the hangers 22 to accommodate the attachment to any particular condition of the vehicle or the surface to be measured. This is particularly desirable for the carrier-frame, especially in measuring a route over a road, inasmuch as the surface wheel can thereby be positioned to the best portion of the road. To permit of this adjustment of the carrier-frame and also of the hangers 22 themselves, there is employed a plurality of holding-collars 28 fitted on the rod 27 and provided with the set-screws 29. These holding-collars are disposed upon opposite sides of the frame-bars and the hangers and after the adjustment of these elements are tightened upon the rod to provide for holding the same in adjusted position.

To provide for the proper handling of the attachment, there is associated therewith a lifting connection 30. This lifting connection 30 is preferably in the form of a strap of sufficient length to extend from the back of the seat of the vehicle to a convenient point upon the carrier-frame. In the construction shown the lifting connection or strap 30 is provided at one end with a snap-hook or equivalent device 31, engaged with one of the bars of the frame 1 and is also provided with a pair of supporting-hooks 32, arranged in spaced relation and either of which is adapted to be engaged with the seat-back of the vehicle. These hooks are preferably adjustable upon the strap 30 to accommodate them to the desired position. One of these hooks is intended to always hold the lifting connection or strap in a position to be reached by the operator during the running of the attachment, while the other hook, when engaged with the seat-back, serves to support the attachment out of use and also in position for the reading of the register or odometer by the operator or inspector. As indicated in dotted lines, the lifting connection or strap may be arranged for connection with the outermost side of the bar of the carrier-frame, so that when pulled upon by the operator may be drawn across the tire of the surface wheel so as to act as a brake for immediately stopping the same as the attachment is lifted from the ground.

Should it be found desirable to provide more positive means for holding the floating surface wheel in contact with the ground, there may be employed an auxiliary holding-spring 33. This holding-spring, as shown in Fig. 5 of the drawings, may be coiled upon the pivot-rod 21 and connected at its opposite extremities, as at 34 and 35, respectively, with one of the hangers 22 and one of the members of the carrier-frame.

From the foregoing it is thought that the construction, use, and many advantages of the herein-described attachment for vehicles will be readily apparent without further description, and it will also be understood that changes in the form, proportion, and minor details of construction may be resorted to without departing from the spirit or scope of the invention or sacrificing any of the advantages thereof.

Having thus described the invention, what is claimed, and desired to be secured by Letters Patent, is—

1. In a distance-measuring attachment for vehicles, a self-adjusting vertically-swinging carrier-frame having hanging means suspending it in trailing position from the vehicle, a register having a fastened connection with the said frame, and a ground-wheel having an independent mounting on the carrier-frame and also having a mechanical operating engagement with the actuator for the register.

2. In a distance-measuring attachment for vehicles, a self-adjusting vertically-swinging carrier-frame having hanging means suspending it in trailing position from the vehicle, a register having a fastened connection with the said frame, a ground-wheel having an independent mounting on the carrier-frame and also having a mechanical operating engagement with the actuator for the register, and lifting means arranged to elevate the frame to a position for exposing the dial of the register to the occupant of the vehicle.

3. In a distance-measuring attachment for vehicles, a self-adjusting vertically-swinging carrier-frame having hanging means for attachment to a vehicle, a register supported by the frame and having its dial exposed away from the vehicle, and lifting means arranged to elevate the carrier-frame for moving the register to a position for exposing its dial to the occupant of the vehicle.

4. In a distance-measuring attachment for vehicles, a carrier-frame having hanging means for suspending it in a trailing position from the vehicle and also provided with a laterally-offset register-support, a register detachably clamped in an upright position on said support with its dial inverted, a surface wheel carried by the frame and coöperating with the register, and lifting means for the frame.

5. In a distance-measuring attachment for vehicles, a self-adjusting vertically-swinging carrier-frame having hanging means for attachment to a vehicle and comprising suitably-connected side bars having journal-supporting ends and one of which is formed with a lateral offset provided with a holding member constituting a register-support, a register detachably clamped in an upright position upon the register-support, a floating surface wheel having its journal fitted to the journal-supporting ends of the frame-bars, and a lifting connection for the carrier-frame.

6. In a distance-measuring attachment for vehicles, a self-adjusting vertically-swinging carrier-frame having a hanger attachment comprising hangers and also means for shifting the frame to laterally-adjusted positions relatively to the hangers, a separate register supported by the frame, and a ground-wheel carried by the frame and coöperating with the actuator for the register.

7. An attachment of the class described comprising a main pivotal support consisting of a horizontal pivot-rod and attachment-hangers loosely connected with said rod having means for clamping upon the axle of a vehicle, a self-adjusting carrier-frame having a pivotal support upon said rod, said hangers and frame being shiftable longitudinally of the rod to laterally-adjusted positions relative to each other, means for holding said elements in said relatively-adjusted positions, a register device supported by the frame, a floating surface wheel carried by the frame and coöperating with the same, and a lifting connection with the frame.

8. An attachment of the class described comprising a main pivotal support consisting of a horizontal pivot-rod and attachment-hangers loosely and adjustably connected with said rod and having means for clamping upon the axle of a vehicle, a self-adjusting carrier-frame having a pivotal and laterally-adjustable support upon said rod, a register device independently supported by the frame, a floating surface wheel carried by the frame and coöperating with the same, a lifting connection with the frame, and a spring coiled upon said rod and connected at its ends respectively with one of the attachment-hangers and a member of the frame.

In testimony whereof I affix my signature in presence of two witnesses.

EUGENE H. HATHAWAY.

Witnesses:
CORNELIUS ECKHARDT,
J. WHIT. HERRON.